United States Patent
Crochet

(10) Patent No.: US 6,176,653 B1
(45) Date of Patent: Jan. 23, 2001

(54) ELECTRICAL FITTING TAP

(76) Inventor: Thomas Crochet, 16204 N. Gallagher Rd., Jennings, LA (US) 70546

( * ) Notice: Under 35 U.S.C. 154(b), the term of this patent shall be extended for 0 days.

(21) Appl. No.: 09/390,762

(22) Filed: Sep. 7, 1999

(51) Int. Cl.[7] .................................................. B23G 5/06
(52) U.S. Cl. .......................... 408/222; 470/198; 470/199
(58) Field of Search ............................. 29/81.021, 81.11, 29/81.17; 15/104.05, 104.13, 236.08, 236.09, 236.1; 408/222, 215; 470/198, 199, 204

(56) References Cited

U.S. PATENT DOCUMENTS

| | | | |
|---|---|---|---|
| 379,213 | * 3/1888 | Firth et al. ............................. | 470/198 |
| 984,577 | * 2/1911 | MacGlenn ............................. | 408/200 |
| 1,196,415 | * 8/1916 | Abrahamson ........................ | 470/199 |
| 1,328,279 | * 1/1920 | Grauer ................................. | 408/200 |
| 1,975,025 | * 9/1934 | Stade .................................... | 470/199 |
| 2,110,618 | * 3/1938 | Baird .................................... | 470/198 |
| 2,391,223 | * 12/1945 | Burrows .............................. | 408/222 |
| 2,787,798 | * 4/1957 | Rosan ................................... | 470/204 |
| 3,531,810 | * 10/1970 | Fure ..................................... | 408/199 |
| 3,579,689 | * 5/1971 | Ferkovich ............................ | 470/199 |
| 3,694,838 | * 10/1972 | Runton ................................. | 470/199 |
| 4,014,063 | 3/1977 | Bunke ................................... | 15/111 |
| 4,090,808 | * 5/1978 | Nannen ................................ | 408/222 |
| 4,121,486 | * 10/1978 | Frank ................................... | 470/198 |
| 4,575,892 | 3/1986 | Ross ..................................... | 15/106 |
| 4,889,460 | 12/1989 | Laidlaw et al. ..................... | 411/437 |
| 4,899,409 | 2/1990 | Cox, Jr. ................................ | 7/167 |
| 5,197,832 | * 3/1993 | Porter, Jr. ............................ | 408/222 |
| 5,307,550 | * 5/1994 | Brunet ................................. | 408/222 |
| 5,566,416 | 10/1996 | Karls .................................... | 15/104.04 |
| 5,600,862 | 2/1997 | Bleske et al. ....................... | 15/104.04 |
| 5,718,636 | * 2/1998 | Meyn et al. .......................... | 470/198 |
| 5,803,676 | * 9/1998 | Wienss ................................. | 408/238 |
| 5,842,924 | * 12/1998 | Manos et al. ........................ | 470/198 |

* cited by examiner

Primary Examiner—Daniel W. Howell
(74) Attorney, Agent, or Firm—Henderson & Sturm LLP

(57) ABSTRACT

An electrical fitting tap for retapping the hollow interior edge of a junction box or the like comprising a unit having two milled taps that are opposed and concentrically aligned at a joint provided with four opposing holes within which a cheater bar can be inserted. The center of each of the taps is open so that wires within the electrical fitting box can be threaded through the tool and positioned out of the way when the retapping is accomplished.

3 Claims, 1 Drawing Sheet

ELECTRICAL FITTING TAP

BACKGROUND OF THE INVENTION

1. Field of the Invention

The present invention relates to the field of hand tools, and more particularly to tools for cleaning threaded fittings.

2. Description of Related Art

As can be seen by reference to the following U.S. Pat. Nos. 4,014,063; 4,575,892; 4,889,460; 4,899,409; 5,566,416; and 5,600,862, the prior art is replete with myriad and diverse tools for cleaning threaded fittings.

While all of the aforementioned prior art constructions are more than adequate for the basic purpose and function for which they have been specifically designed, they are uniformly deficient with respect to their failure to provide a simple, efficient, and practical electrical fitting tap.

As a consequence of the foregoing situation, there has existed a longstanding need for a new and improved type of electrical fitting tap, and the provision of such a construction is a stated objective of the present invention.

BRIEF SUMMARY OF THE INVENTION

Briefly stated, the present invention provides an electrical fitting tap for retapping the hollow interior edge of a junction box or the like comprising a unit having two milled taps that are opposed and concentrically aligned at a joint provided with four opposing holes within which a cheater bar can be inserted. The center of each of the taps is open so that wires within the electrical fitting box can be threaded through the tool and positioned out of the way when the retapping is accomplished.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
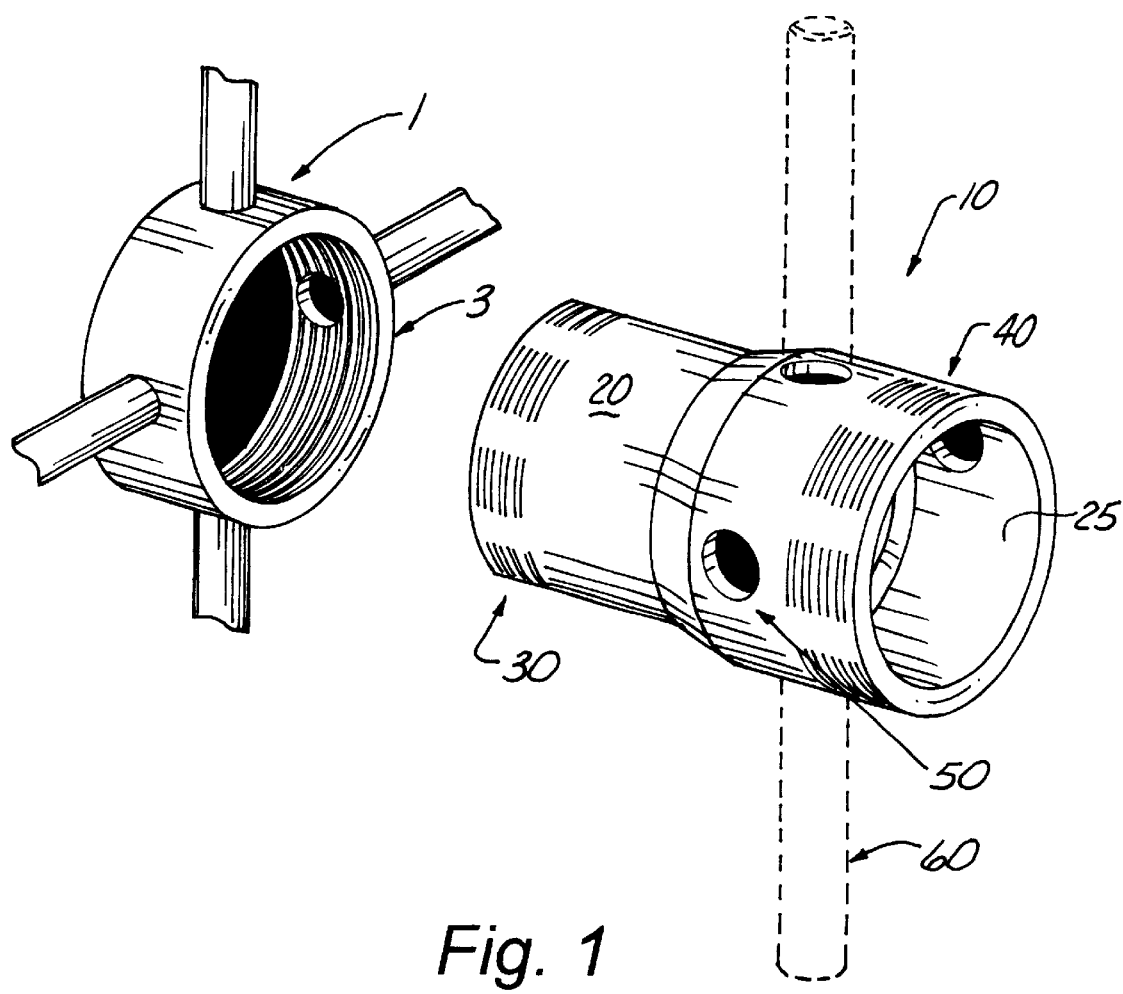
FIG. 1 is a perspective view of the electrical fitting tap of the present invention as it is being positioned to engage and clean the threads of an electrical junction box.

As can be seen by reference to the drawings, and in particular to FIG. 1, the electrical fitting tap that forms the basis of the present invention is designated generally by the reference number 10. The tap 10 includes a hollow body member 20 formed of tubular steel. The opposite ends of the body member 20 have milled taps 30, 40 of the two different sizes to fit the most common junction boxes 1. The central portion of the body member 20 has two pairs of opposing holes 50 that are adapted to receive a cheater bar or lever arm 60 to assist in TURNING the tap 10 when cleaning the rusted threads 3 of the junction box 1.

In use, when the user is required to repair a junction box 1, the cover is removed and repairs made. In the case where the threaded fittings 3 have become rusted or otherwise corroded and prevent the replacement of the cover, the tap 30 or 40 of the appropriate size is inserted into the threaded area of the box 1. The cheater bar 60 is inserted into one of the two pairs of holes 50 to facilitate turning the tap 10 and making the cleaning to the fittings easier on the operator. When complete, a new cover is attached to the junction box 1. The electrical fitting tap 10 provides the operator with a much safer and less costly method of cleaning fittings than the current method, which involves scraping and brushing, or replacement of the junction box 1 which requires shutting down the equipment. The hollow interior 25 of the body member 20 allows wires to be positioned out of the way when the threads 3 are being cleaned and retapped.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

I claim:

1. An electrical fitting tap, comprising:
    a body member having first and second ends and a hollow interior;
    a first milled tap formed on the first end, the first tap being sized to correspond to a first standard junction box; and
    a second milled tap formed on the second end and being concentrically aligned with the first tap, the second tap being sized to correspond to a second standard junction box.

2. The electrical fitting tap of claim 1 further including:
    a first pair of opposing holes formed in the body member intermediate the first and second ends, the first pair of holes being disposed to receive a lever to assist in turning the fitting tap.

3. The electrical fitting tap of claim 2 further including a second pair of opposing holes formed in the body member in axial alignment with the first pair of holes, the second pair of holes being disposed to receive a lever to assist in turning the fitting tap.

* * * * *